United States Patent
Buhler et al.

(10) Patent No.: US 8,423,783 B2
(45) Date of Patent: Apr. 16, 2013

(54) SECURE PIN MANAGEMENT OF A USER TRUSTED DEVICE

(75) Inventors: Peter Buhler, Horgen (CH); Harold D. Dykeman, Richterswil (CH); Thomas Eirich, Waedenswil (CH); Matthias Kaiserswerth, Richterswil (CH); Thorsten Kramp, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/783,210

(22) Filed: May 19, 2010

(65) Prior Publication Data
US 2011/0131639 A1    Jun. 2, 2011

(30) Foreign Application Priority Data
Nov. 27, 2009 (EP) .................................. 09177384

(51) Int. Cl.
*G06F 21/00* (2006.01)
*G06F 17/30* (2006.01)

(52) U.S. Cl.
USPC .................................. 713/185; 726/9; 726/20

(58) Field of Classification Search .................. 713/150, 713/155, 164–171, 182–185, 189, 192–194; 726/2–6, 9, 16–18, 20
See application file for complete search history.

(56) References Cited

U.S. PATENT DOCUMENTS

| | | | | |
|---|---|---|---|---|
| 5,060,263 A | * | 10/1991 | Bosen et al. | 713/184 |
| 5,485,519 A | * | 1/1996 | Weiss | 713/185 |
| 5,623,637 A | * | 4/1997 | Jones et al. | 711/164 |
| 5,694,471 A | * | 12/1997 | Chen et al. | 705/76 |
| 5,953,422 A | * | 9/1999 | Angelo et al. | 713/185 |
| 7,080,781 B1 | | 7/2006 | Kolbeck | |
| 7,392,534 B2 | | 6/2008 | Lu et al. | |
| 2002/0046342 A1 | * | 4/2002 | Elteto et al. | 713/185 |
| 2003/0002667 A1 | * | 1/2003 | Gougeon et al. | 380/44 |
| 2003/0204732 A1 | * | 10/2003 | Audebert et al. | 713/182 |
| 2003/0217270 A1 | * | 11/2003 | Nakayama | 713/172 |
| 2003/0229791 A1 | * | 12/2003 | De Jong | 713/182 |
| 2004/0059916 A1 | * | 3/2004 | Mizushima et al. | 713/172 |
| 2004/0103325 A1 | * | 5/2004 | Priebatsch | 713/202 |
| 2005/0081041 A1 | * | 4/2005 | Hwang | 713/176 |

(Continued)

OTHER PUBLICATIONS

Weigold, Thomas et al., "The Zurich Trusted Information Channel—An Efficient Defence against Man-in-the-Middle and Malicious Software Attacks", IBM Zurich Research Laboratory, 2008, 10 pages.
International Search Report and Written Opinion dated Mar. 15, 2011 for International Application No. PCT/IB2010/055325, 12 pages.

(Continued)

*Primary Examiner* — Darren B Schwartz
(74) *Attorney, Agent, or Firm* — Francis Lammes; Stephen J. Walder, Jr.; Eustus D. Nelson

(57) ABSTRACT

A mechanism is provided for secure PIN management of a user trusted device. A user trusted device detects a memory card coupled to the user trusted device. The user trusted device receives user input of an external PIN (ext_PIN). The user trusted device identifies a key (K) associated with the external PIN, wherein the key is stored in the persistent memory. The user trusted device computes a card PIN (card_PIN) using a function (f) and the key as stored on the persistent memory, wherein the card PIN is computed using the following equation: card_PIN=f(K, ext_PIN). The user trusted device unlocks the memory card using the card PIN, thereby forming an unlocked memory card.

20 Claims, 3 Drawing Sheets

U.S. PATENT DOCUMENTS

| | | | | |
|---|---|---|---|---|
| 2007/0277044 | A1* | 11/2007 | Graf et al. | 713/185 |
| 2009/0031408 | A1* | 1/2009 | Thom et al. | 726/9 |
| 2009/0132808 | A1 | 5/2009 | Baentsch et al. | |
| 2009/0290708 | A1* | 11/2009 | Schneider | 380/46 |
| 2010/0031051 | A1* | 2/2010 | Machani et al. | 713/181 |
| 2010/0100721 | A1* | 4/2010 | Su et al. | 713/150 |

OTHER PUBLICATIONS

Weigold, Thomas et al., "The Zurich Trusted Information Channel—An Efficient Defence Against Man-in-the-Middle and Malicious Software Attacks", Trusted Computing—Challenges and Applications; Springer Berlin Heidelberg, Berlin, Heidelberg, XP019089491; ISBN 978-3-540-68978-2, Mar. 11, 2008, pp. 75-91.

* cited by examiner

SECURE PIN MANAGEMENT OF A USER TRUSTED DEVICE

BACKGROUND

The invention relates to user trusted devices using a personal identification number (PIN)-protected memory card such as a smart card, such as those used for Internet banking. In particular, it relates to secure PIN management of such devices.

Security problems with personal computers (PCs) make them unsuitable for many functions since data entered by users can be manipulated or copied by an attacker. Transactions can be changed to send money to unwanted recipients or to order unwanted goods, or user credentials can be copied providing attackers with access to systems such as those used for Internet banking.

To solve some of these problems, a user trusted device (also a "secure device") can be used together with a PC. One such solution, the IBM® Zone Trusted Information Channel (see Thomas Weigold, Thorsten Kramp, Reto Hermann, Frank Höring, Peter Buhler, Michael Baentsch, "The Zurich Trusted Information Channel—An Efficient Defence against Man-in-the-Middle and Malicious Software Attacks", In P. Lipp, A.-R. Sadeghi, and K.-M. Koch (Eds.): TRUST 2008, LNCS 4968, pp. 75-91, 2008), allows the user to verify information associated with a transaction (e.g. in the case of Internet banking the amount and recipient) before the transaction is executed by the service provider (e.g. the bank). The transaction is verified on the device, which is secure and can send the verified information to the back-end system in a secure manner.

To access an Internet service, the user has credentials that are used to identify him/her to that service. Such credentials are sometimes stored on a smart card. In this case, the secure device has a smart card reader to allow these credentials to be used. To ensure that the credentials can only be used by the intended users, the smart card is protected by a PIN. The PIN is thus kept secret; otherwise it could be used by someone else to access the server. The smart card may also be used for purposes other than authenticating users for Internet transactions. For example the same card may be used for getting cash from ATMs. In such cases the card's PIN requires even stronger protection.

In a secure device, memory is usually partitioned into persistent (or non-volatile) and transient (also non-persistent or volatile) portions. Persistent memory retains its information stored independent of the operating mode of the device, for example, when the device is "off" or the main battery has been removed. Persistent memory can be implemented using e.g. read only memory (ROM), programmable ROM, electrically erasable, programmable ROM (EEPROM), using battery backed-up static random access memory (SRAM) or dynamic random access memory (DRAM). Transient memory only retains information stored thereon during active operation of the device and is typically implemented with SRAM or DRAM. In running an application in the device, it is common to perform a save operation, whereby contents in the transient memory is stored on the persistent memory.

BRIEF SUMMARY

In one illustrative embodiment, a method, in a data processing system, is provided for secure PIN management of a user trusted device. In the illustrative embodiment a memory card coupled to the user misted device is detected. In the illustrative embodiment user input of an external PIN (ext_PIN) is received. In the illustrative embodiment a key (K) associated with the external PIN is identified, the key is stored in the persistent memory. In the illustrative embodiment a card PIN (card_PIN) is computed using a function ($f$) and the key as stored on the persistent memory, wherein the card PIN is computed using the following equation: card_PIN=$f$(K, ext_PIN). In the illustrative embodiment the memory card is unlocked using the card PIN, thereby forming an unlocked memory card.

In other illustrative embodiments, a computer program product tangible embodied in a machine-readable storage device having a computer program code stored thereon is provided. The computer program code, when executed on a computing system, causes the computing system to perform various ones, and combinations of, the operations outlined above with regard to the method illustrative embodiment.

In yet another illustrative embodiment, a user trusted device is provided. The user trusted device may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

DETAILED DESCRIPTION

As an introduction to the following description, it is first pointed at a general aspect of the invention, directed to a computer-implemented method for secure personal identification number (PIN) management of a user trusted device. Instead of using the card's PIN, an external PIN is entered by the user at an external terminal (e.g. a personal computer (PC)), to be used in place of the actual card's PIN. During an initialization phase, the device uses the external PIN and the card's PIN to generate a key, which shall later allows for retrieving the card's PIN and unlock the card, during a phase of use. A subsequent trustworthy connection to a server can for instance be initiated, based on e.g. user credentials as stored on the card.

Figure 1:
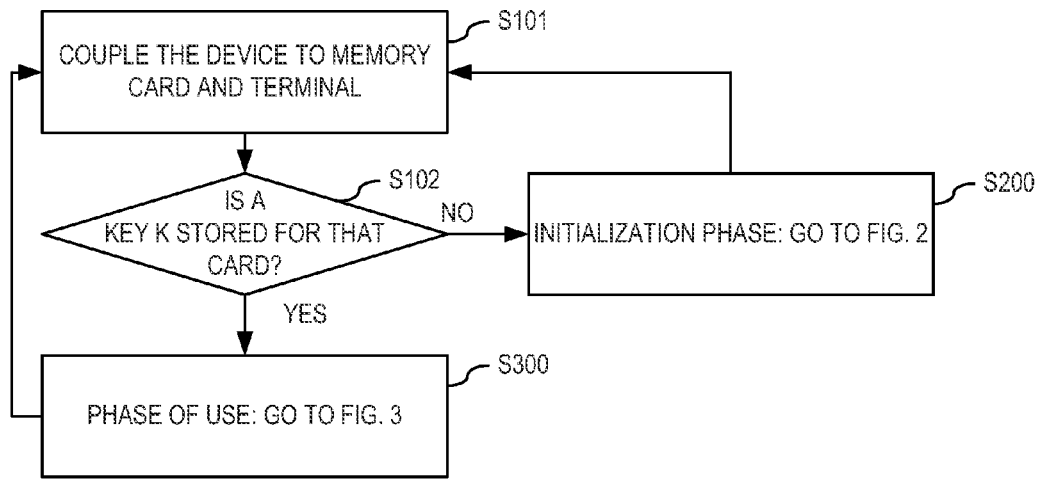
FIG. 1 is a flowchart of a high-level embodiment of the method according to the invention.
Figure 2:
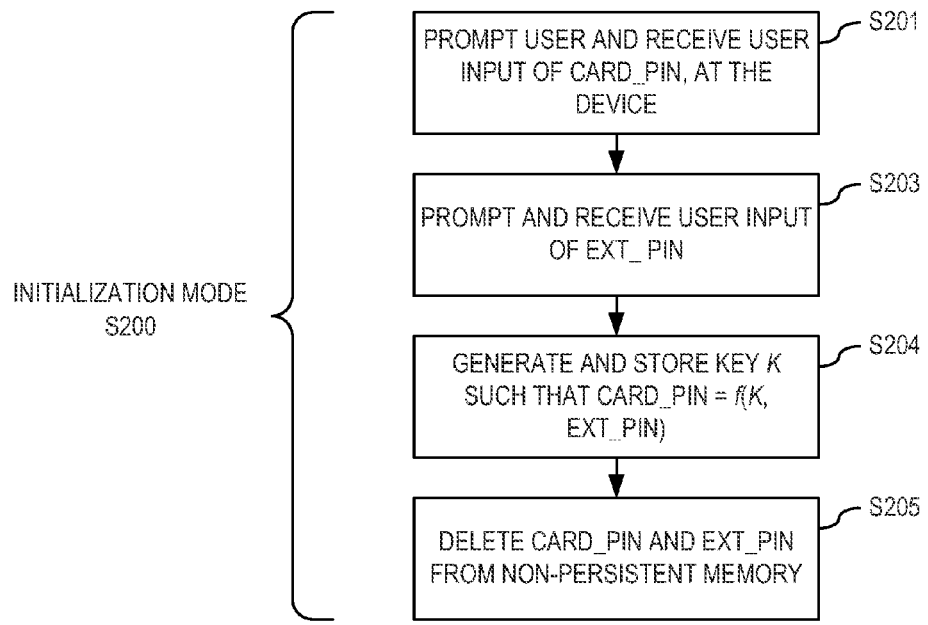
FIG. 2 is a flowchart illustrating operations as carried out during an initialization phase, in an embodiment.
Figure 3:
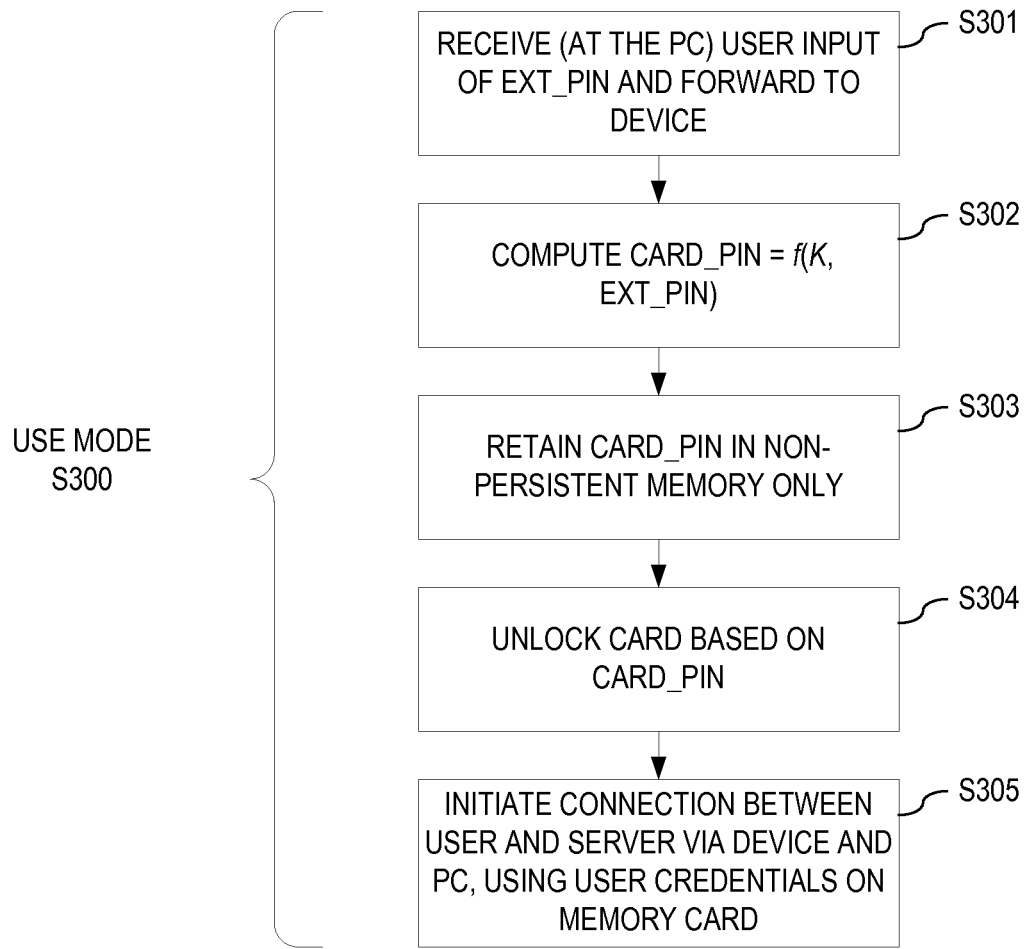
FIG. 3 a flowchart illustrating operations as carried out during a phase of use, according to an embodiment.

More in details, FIGS. 1-3 depict flowcharts illustrating a given embodiment of a method of secure PIN management of a trusted device. FIG. 1 points at both FIG. 2 and FIG. 3, which relate to an initialization phase and a phase of use, respectively. In the following, embodiments are described in reference to FIGS. 1-3 altogether.

First, it is assumed that the secure device has computing means (e.g. a processing unit), coupled to both persistent and non-persistent memories, as known per se. It further at step S101 possesses suitable interfaces for coupling to a memory card, e.g. a smart card, and a terminal. Additional interface allows for interacting with a user.

Second, once coupled to a memory card, the device may either be set in an initialization mode, step S200 or a use mode, step S300. Typically, the device identifies the card. Then, if no key is found to be stored for that card yet (decision S102: NO), an initialization mode is set, else (decision S102: YES) it directly set in use mode.

Thus, if no external PIN has been registered yet, the task flow continues on FIG. 2 (initialization time). Here, the user enters two PINs, steps S201, S203: one of them is the card's PIN (or card_PIN), i.e. capable of unlocking the card; the other is the external PIN, preferably entered at the external terminal (denoted by ext_PIN in the drawings).

Preferably, the card PIN is entered by the user directly at the device, for safety. The external PIN can be entered at the device too, although it could be entered from the PC, in a variant. Yet, the less inputted from the PC, the better the safety.

Furthermore, the card PIN and external PIN are preferably retained in the non-persistent memory only, after reception at the device. In this case, the PINs shall be retained the time of generating the key and deleted after, ensuring a short exposure time. In a variant, the external PIN is stored on the persistent memory, for a later use.

Most generally, the two PINs may be entered in any order. Preferably yet, the user is first prompted to enter the card PIN (step S201), after insertion of the card. Then, if the entry is successful (the device unlocks the card), the user is then invited to enter the external PIN. The invitation is for instance made at the device or at the PC.

Third, the PINs received allows for generating, step S204, a key K via the computing means. The key is subsequently stored on the persistent memory of the device. It is furthermore generated such that the card PIN can later be computed via a function $f$, as stored on the persistent memory, namely:

$$card\_PIN = f(K, ext\_PIN),$$

wherein $f$ takes the external PIN and the key as argument. Thus, the card's PIN can be regarded as an encrypted version of the PC's PIN.

The function $f$ can be as simple as an exclusive OR (XOR) encryption of the key and the ext_PIN, where the XOR is the exclusive OR operator that returns e.g. 1 when the value of either the first bit or the second bit is a 1. As a result, if x XOR y=z, then z XOR x equals y. Thus, it is impossible to reverse the operation without knowing the initial value of one of the two arguments, such that presuming that the function is XOR doesn't help. If, however, one knows either x or y, then it is reversible. For example, if x XOR 1 returns 1, then x=0, and if it returns 0, then x=1. Similarly, the key K can first be generated from ext_PIN and card_PIN. Next, if one has the encrypted string and the key, it is possible to decrypt correctly, such that card_PIN can later be retrieved, starting from K and ext_PIN. Without K, it is impossible to decrypt without making random keys and attempting each of them. The longer the encryption key, the more difficult it is to break it. For completeness, XOR encryption of a PIN can be obtained by repeatedly applying the key to successive segments (e.g. numbers) of the PIN and storing the output.

In a variant, the key and external PIN could else be combined to create another key that is for example used to encrypt the Card_PIN.

Once generated, the key can then be stored on the persistent memory, for later use. The card PIN previously retained in the non-persistent memory can now be deleted, step S205. The card's PIN thus resides during a short time only in the memory. The external PIN can be deleted too (possibly after it has been stored on the persistent memory, according to the variant evoked earlier).

At present, the device is PIN-personalized with respect to the card to which it was coupled to. A flag value can for instance be stored which indicates that an external PIN is now registered at the device, in relation to that card. Later, if it is detected that an external PIN has already been registered for the card (e.g. based on the flag value stored), then the device may skip the initialization step. Rather, it enters a mode of use, as to be discussed later in reference to FIG. 3.

Similarly, if the device is later coupled to another card (again, PIN-protected), the new card's PIN and an external PIN are again used to generate a new key. Thus, the new card PIN can later be computed using the same function $f$, taking the new key and the external PIN as argument.

The user may for instance want to use always the same external PIN: (s)he would then have to enter it each time a key needs be generated. Thus, the external PIN doesn't need to be stored on the non-persistent memory. Yet, in a variant evoked earlier, a reference external PIN can be stored on the device (e.g. obfuscated), such that the user needs not be prompted to enter a new external PIN. Entering the new card's PIN would suffice in that case. This variant is however not preferred, since then there remains a possibility that the external PIN and the key be both read out of the device memory and, assuming the attacker knows the function, used to generate the card's PIN.

The process can be repeated for as many cards as needed.

Next, during the phase of use, the user is first prompted to enter the external PIN, upon coupling the device to the card, step S301. The external PIN is preferably entered at the terminal, which usually is more practical, owing to the likely more suited human interfaces. Then, the external PIN can be communicated to the device, where it is preferably retained in the non-persistent memory only.

Second, computing means at the device are instructed to compute (S302) the card PIN, using the function $f$ and the key as stored in relation to the card, in the persistent memory. Again, the card PIN is preferably retained in the non-persistent memory only, step S303.

Finally, the (re-)computed card PIN can be used to unlock the card, step S304.

Now, in a variant, if the user forgets his/her external PIN, the card's PIN can yet be entered directly on the device, even if the device is in a PIN-personalized state. Entering the card's PIN at the device instead of the external PIN overrides the card's PIN re-computation and can results in unlocking the card. Preferably, after entering the card's PIN at the device, the user is prompted to enter a new external PIN, such that a new key can be generated.

Note that a number of variants as described above can be advantageously combined. For instance, in a particularly advantageous embodiment, the following takes place. Initially the device has no information regarding the card's PIN; it is non PIN-personalized yet. Then, when the user inserts a smart card into the device's reader, (s)he is prompted to enter the card's PIN on the device. If the latter entry is successful, the user is then prompted to enter a new PIN. i.e. the external PIN. The latter is entered on the PC or the device. The device then performs a number of checks with respect to the external PIN (e.g. it checks that it is not the same as the card's PIN). Furthermore the device generates a key such that, given the external PIN and key, the card's PIN can be computed using the function $f$. The key is then stored on the device and the device is now said to be in a PIN-personalized state. No PIN is stored permanently on the device. Next, when the user inserts the smart card into the device (now PIN-personalized), (s)he is prompted to enter the external PIN on the PC. The external PIN is passed to the device which can then compute the card's PIN, using the external PIN and key, lithe external PIN was entered correctly, the device computes the correct card's PIN and thus unlocks the user's card as desired. Now, if the user forgets his/her external PIN, the card's PIN can yet be entered directly on the device, even if the device is in a PIN-personalized state, and then a new external PIN can be set. The same procedure can be used to change the external PIN at any time. If the user has multiple smart cards that can be used with a single device, the device can determine which card is inserted and will thus know which key to use so that the correct card's PIN is computed. Yet, a single external PIN can be used as opposed to having one external PIN per card, as discussed earlier.

Note that entering an external PIN on the PC is more convenient for the user than entering the card's PIN on the secure device. Yet, this does not compromise the security of the system since the user's card's PIN is not exposed and cannot be computed by an attacker (the attacker does at least not know the key used to compute the card's PIN).

If an attacker manages to steal the external PIN and knows the function $f$, a brute-force attack on the key (guessing possible keys) will result in a large number of reasonable plain texts which an attacker would have to try one by one. This is however not a problem since smart cards only allow a very small number of retries (e.g. 3 or 5) before blocking the card's function.

Also, the function $f$ can be chosen so that it produces a viable result for any guessed key, thus making such an attack effectively impossible.

At present, suitable use can safely be made out of data, e.g. user credentials as stored on the card. In particular, a trustworthy connection can be established, step S305, between a user (or strictly speaking the device) and a server, via the terminal, and using such data.

More in details, the device is preferably provided with a computerized method, stored on the persistent memory, for establishing (see S304) a trustworthy connection between the device and the server.

Figure 4:
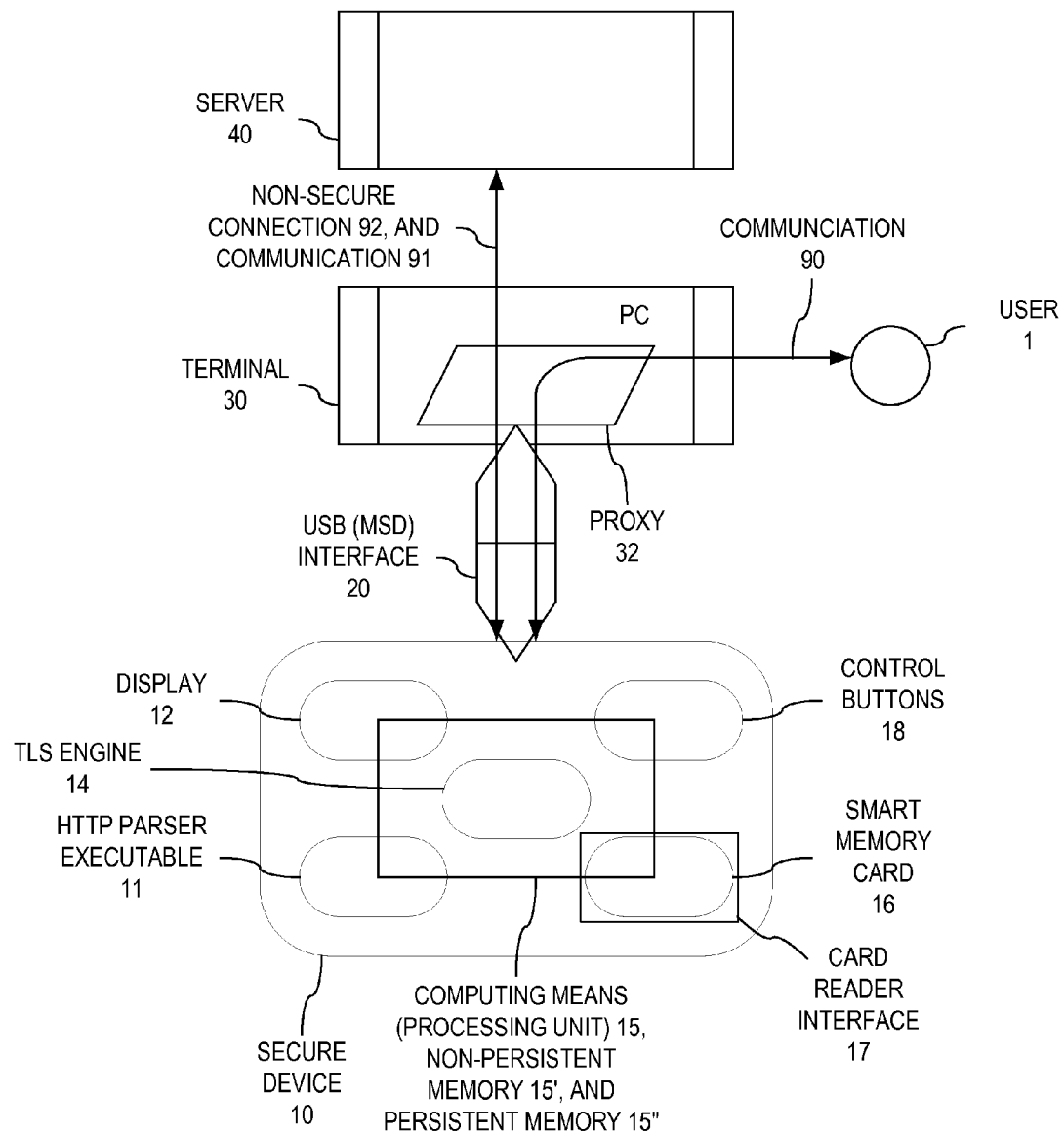
FIG. 4 is a schematic representation of a trusted device coupled to a terminal and a server, for initiating a trustworthy connection to a server, according to a specific embodiment of the invention.

More shall be said in reference to FIG. 4, showing a schematic representation of a trusted device coupled to a terminal and a server.

As described above, the secure device 10, which may also be referred to as a trusted device or a user trusted device, has computing means (processing unit) 15 coupled to the non-persistent memory 15' and the persistent memory 15". It further has suitable interfaces 17, 20 for communicating with a smart memory card 16 and a terminal 30. Further interfaces (like control buttons 18 and display 12) allow for interaction with a user 1 via connection 90.

The secure device 10 is further designed for detecting whether a key is already stored for the smart memory card 16 currently coupled. If not, then it shall prompt the user 1 to enter both the external PIN and the card's PIN via connection 90. The latter (especially) is entered directly at the secure device 10 via convenient input means 18, such as buttons/selectors. In turn, a logic circuit can instruct the computing means 15 to generate and store the key in the persistent memory 15". Then, during the phase of use, the secure device 10 can receive the external PIN from the terminal 30, re-compute the card's PIN and thereby unlock the smart memory card 16.

The secure device 10 can invoke the computerized method stored thereon to trigger a trustworthy connection to the server 40. For instance, secure device 10 may establish a communication 91 with the server 40 over a non-secure connection 92 via the terminal 30, upon unlocking the card. Authenticating the secure device 10 to the server 40 can be done while initiating the communication 91 over the non-secure connection 92, e.g. by initiating a Secure Sockets Layer (SSL)/Transport Layer Security (TLS) (SSL/TLS) authentication to the server 40, using user credentials as stored on the smart memory card 16. In this regards, setting the secure device 10 in communication with the server 40 may advantageously comprises starting, from the secure device 10, a proxy client 32 residing at the terminal 30, in order for the secure device 10 to connect to the server 40, via the terminal 30 (note that the proxy 32 may possibly reside on the secure device 10 too). The proxy 32 relays bits received from the secure device 10 to the internet and vice versa. Authenticating the secure device 10 to the server 40 can be achieved, e.g. bi-directionally, by initiating from the secure device 10 the SSL/TLS authentication to the server 40.

Thus, an SSL/TLS channel is set between the server 40 and the secure device 10. Sensitive user-server communication is passed through and processed at the secure device 10, hooked into the path to the server 40 by the proxy 32. The secure device 10 intercepts the communication flow. The secure device 10 may for instance continuously scans exchanged data for sensitive operations. Critical information can thereby be extracted for subsequent display at the secure device 10.

The user 1 can accordingly verify the displayed information. Non-sensitive operations are instead allowed to be passed along the secure device 10 to go to the PC.

Meanwhile, sensitive personal information as stored on the smart memory card 16 (e.g. a private key used in SSL/TLS) is hold at the secure device 10. Private data are protected from extraction and duplication in the smart memory card 16 within the secure device 10. A trusted and tamper-resistant secure communication is thereby obtained at the secure device 10 endpoint.

Referring more particularly to FIG. 4, the secure device 10 may for instance look as a usual USB device 10, comprising a processing unit 15, using one or more processors, and coupled to both non-persistent 15' memory and persistent 15" memory. The persistent memory 15" notably stores suitable code for generating and storing the key evoked earlier. The function used at re-computation of the card's PIN is also stored on the persistent memory 15". Code is further stored which allows to re-compute the card's PIN and unlock the smart memory card 16. The persistent memory 15" may further have stored thereon a security software stack, including cryptographic algorithms, e.g. a TLS engine 14 for the SSL/TLS authentication. The computerized method for establishing the trustworthy connection to server 40 is stored on the persistent memory 15" too. It may further include Hypertext Transfer Protocol (HTTP) parser executable 11 (for parsing data and thereby scan them), a USB management software (implementing the Universal Serial Bus (USB) mass storage device (MSD) or MSD profile 20), and possibly a pre-loaded networking proxy 32, as evoked above. As said too, user credentials can be stored on the memory card (e.g. a smart memory card 16), such as client-server certificates (e.g. X.509) enabling TLS-client authentication. The smart memory card 16 may hold sensitive personal information and have encryption means. In variants, the smart memory card 16 cannot encrypt but is used to sign sensitive operations. The secure device 10 is preferably equipped with a standard smart card reader 17. Finally, the secure device 10 has control buttons 18 (e.g. OK, Cancel, etc. selectors) and display 12, for displaying sensitive information.

The computer program code required may be implemented in a high-level (e.g. procedural or object-oriented) programming language, or in assembly or machine language if desired; and in any case, the language may be a compiled or interpreted language. Suitable processors include, by way of example, both general and special purpose microprocessors. Note that instruction operations that the device, the terminal or the server performs may be stored on a computer program product tangibly embodied in a machine-readable storage device for execution by a programmable processor; and method steps of the invention may be performed by one or more programmable processors executing instructions to perform functions of the invention. In all case, the present invention encompasses not only the device but the computer system, extended with a terminal and at least one server.

More generally, the above invention may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks or the like.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, the device may require to be not connected to the PC at the time of entering the card's PIN, if it is provided with a battery.

What is claimed is:

1. A method, in a computing system, for secure PIN management of a user trusted device, the method comprising:
    detecting, by the user trusted device, a memory card coupled to the user trusted device;
    receiving, by the user trusted device, user input of an external PIN (ext_PIN);
    identifying, by the user trusted device, a key (K) associated with the external PIN, wherein the key is stored in the persistent memory;
    computing, by the user trusted device, a computed card PIN (card_PIN) using a function (f) and the key as stored in the persistent memory and the external PIN forming the computed card PIN, wherein the computed card PIN is computed as card_PIN=f(K, ext_PIN);
    responsive to the computed card PIN matching a card PIN of the memory card, unlocking, by the user trusted device, the memory card forming an unlocked memory card;
    responsive to the computed card PIN failing to match the card PIN of the memory card, determining, by the trusted device, whether the external PIN input by the user matches the card PIN of the memory card indicating that the user has forgotten the external PIN;
    responsive to the external PIN matching the card PIN of the memory card, unlocking, by the user trusted device, the memory card, forming the unlocked memory card;
    prompting, by the user trusted device, the user to enter a new external PIN;
    responsive to receiving the new external PIN from the user, generating, by the user trusted device, a new key using the new external PIN, the card PIN and the function (f); and
    storing, by the user trusted device, the new key in the persistent memory.

2. The method of claim 1, wherein the key is generated during an initialization mode and stored in the persistent memory during the initialization mode, wherein the key is generated during the initialization mode using the external PIN and the card PIN of the memory card received by the user trusted device during the initialization mode, wherein the card PIN of the memory card received at the user trusted device is directly entered by the user at the user trusted device, and wherein the external PIN is directly entered at the user trusted device by the user.

3. The method of claim 1, further comprising:
    retaining, by the user trusted device, the card PIN received in the non-persistent memory only after reception at the user trusted device; and
    deleting, by the user trusted device, the card PIN and the external PIN from the non-persistent memory after the key is generated, wherein the external PIN is stored on the persistent memory prior to being deleted from the non-persistent memory.

4. The method of claim 1, wherein the steps of generating and storing the key are executed in response to detecting, by the user trusted device, that no key is stored for the memory card coupled to the user trusted device.

5. The method of claim 1, wherein the steps of generating and storing the key further comprises:
    storing, by the user trusted device, a flag value indicating that a key is stored at the user trusted device in relation to the memory card.

6. The method of claim 1, further comprising:
    detecting, by the user trusted device, another memory card coupled to the user trusted device, wherein the another card is PIN-protected with another card PIN;
    receiving, by the user trusted device, the other card PIN;
    generating, by the user trusted device, in the persistent memory another key for the other memory card, such that the other card PIN is computed at a later time via the function (f) using the other key and the external PIN as arguments.

7. The method of claim 6, further comprising:
    generating, by the user trusted device, the other key such that the other card PIN is computed via the function (f) using as arguments the other key and the external PIN.

8. The method of claim 1, further comprising:
    establishing, by the user trusted device, a trustworthy connection between a user and at least one server via the user trusted device and a terminal using data stored on the unlocked memory card.

9. The method of claim 8, wherein the establishing of the trustworthy connection is triggered by unlocking the memory card.

10. The method of claim 9, wherein the trustworthy connection is established by setting, by the user trusted device, the user trusted device in communication with the server over a non-secure connection via the terminal.

11. The method of claim 10, further comprising:
authenticating the user trusted device to the server by initiating the communication to be set over the non-secure connection by initiating a Secure Sockets Layer/Transport Layer Security (SSL/TLS) communication.

12. The method of claim 11, wherein:
the step of setting the user trusted device in the communication with the server further comprises starting, from the user trusted device, a proxy client residing at the terminal, in order to connect to the server via the SSL/TLS communication; and
the step of authenticating the user trusted device to the server comprises a SSL/TLS authentication with the server.

13. A user trusted device, comprising:
a processor; and
a memory coupled to the processor, wherein the memory comprises instructions which, when executed by the processor, cause the processor to:
detect a memory card coupled to the user trusted device;
receive user input of an external PIN (ext_PIN);
identify a key (K) associated with the external PIN, wherein the key is stored in a persistent memory;
compute a computed card PIN (card_PIN) using a function ($f$) and the key as stored in the persistent memory and the external PIN forming the computed card PIN, wherein the computed card PIN is computed as card_PIN =$f$(K, ext_PIN);
responsive to the computed card PIN matching a card PIN of the memory card, unlock the memory card forming an unlocked memory card
responsive to the computed card PIN failing to match the card PIN of the memory card, determine whether the external PIN input by the user matches the card PIN of the memory card indicating that the user has forgotten the external PIN;
responsive to the external PIN matching the card PIN of the memory card, unlock the memory card, forming the unlocked memory card;
prompt the user to enter a new external PIN;
responsive to receiving the new external PIN from the user, generate a new key using the new external PIN, the card PIN and the function ($f$); and
store the new key in the persistent memory.

14. The user trusted device of claim 13, wherein the key is generated during an initialization mode and stored in the persistent memory during the initialization mode, wherein the key is generated during the initialization mode using the external PIN and the card PIN of the memory card received by the user trusted device during the initialization mode, wherein the card PIN of the memory card received at the user trusted device is directly entered by the user at the user trusted device, and wherein the external PIN is directly entered at the user trusted device by the user.

15. The user trusted device of claim 13, wherein the instructions further cause the processor to:
establish a trustworthy connection between a user and at least one server via the user trusted device and a terminal using data stored on the unlocked memory card, wherein the establishing of the trustworthy connection is triggered by unlocking the memory card and wherein the trustworthy connection is established by setting, by the user trusted device, the user trusted device in communication with the server over a non-secure connection via the terminal.

16. The user trusted device of claim 15, wherein the instructions further cause the processor to:
authenticate the user trusted device to the server by initiating the communication to be set over the non-secure connection by initiating a SSL/TLS communication.

17. A computer program product tangibly embodied in a machine-readable storage device a computer program code, wherein the computer program code, when executed on a computing system, causes the computing system to:
detect a memory card coupled to the user trusted device;
receive user input of an external PIN (ext_PIN);
identify a key (K) associated with the external PIN, wherein the key is stored in a persistent memory;
compute a computed card PIN (card_PIN) using a function ($f$) and the key as stored in the persistent memory and the external PIN forming the computed card PIN, wherein the computed card PIN is computed as card_PIN =$f$(K, ext_PIN);
responsive to the computed card PIN matching a card PIN of the memory card, unlock the memory card forming an unlocked memory card
responsive to the computed card PIN failing to match the card PIN of the memory card, determine whether the external PIN input by the user matches the card PIN of the memory card indicating that the user has forgotten the external PIN;
responsive to the external PIN matching the card PIN of the memory card, unlock the memory card, forming the unlocked memory card;
prompt the user to enter a new external PIN;
responsive to receiving the new external PIN from the user, generate a new key using the new external PIN, the card PIN and the function ($f$); and
store the new key in the persistent memory.

18. The computer program product of claim 17, wherein the key is generated during an initialization mode and stored in the persistent memory during the initialization mode, wherein the key is generated during the initialization mode using the external PIN and the card PIN of the memory card received by the user trusted device during the initialization mode, wherein the card PIN of the memory card received at the user trusted device is directly entered by the user at the user trusted device, and wherein the external PIN is directly entered at the user trusted device by the user.

19. The computer program product of claim 17, wherein the computer program code further causes the computing system to:
establish a trustworthy connection between a user and at least one server via the user trusted device and a terminal using data stored on the unlocked memory card, wherein the establishing of the trustworthy connection is triggered by unlocking the memory card and wherein the trustworthy connection is established by setting, by the user trusted device, the user trusted device in communication with the server over a non-secure connection via the terminal.

20. The computer program product of claim 19, wherein the computer program code further causes the computing system to:
authenticate the user trusted device to the server by initiating the communication to be set over the non-secure connection by initiating a SSL/TLS communication.

* * * * *